US011538043B2

(12) United States Patent
Shinde et al.

(10) Patent No.: US 11,538,043 B2
(45) Date of Patent: Dec. 27, 2022

(54) SYSTEM AND METHOD FOR PROCESSING A CARD-NOT-PRESENT PAYMENT TRANSACTION BY A PURCHASER USING A FRIEND'S CARD FOR OBTAINING A REWARD

(71) Applicant: MASTERCARD INTERNATIONAL INCORPORATED, Purchase, NY (US)

(72) Inventors: Ganesh Shinde, Pune Maharashtra (IN); Ravi Pareek, Pune Maharashtra (IN); Arunmurthy Gurunathan, Pune Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 168 days.

(21) Appl. No.: 16/514,511

(22) Filed: Jul. 17, 2019

(65) Prior Publication Data
US 2020/0051085 A1 Feb. 13, 2020

(30) Foreign Application Priority Data
Aug. 8, 2018 (SG) .......................... 10201806753R

(51) Int. Cl.
*G06Q 20/40* (2012.01)
*G06Q 30/02* (2012.01)
(Continued)

(52) U.S. Cl.
CPC ....... *G06Q 20/409* (2013.01); *G06Q 20/0855* (2013.01); *G06Q 20/351* (2013.01); *G06Q 30/0226* (2013.01)

(58) Field of Classification Search
CPC ............. G06Q 20/409; G06Q 20/0855; G06Q 20/351; G06Q 30/0226; G06Q 20/367; G06Q 20/388; G06Q 20/403
See application file for complete search history.

(56) References Cited

U.S. PATENT DOCUMENTS 5,883,810 A 3/1999 Franklin et al.
6,598,031 B1 7/2003 Ice
(Continued)

FOREIGN PATENT DOCUMENTS

CA 2826794 A1 * 3/2014 ............ G06Q 20/02
JP 06282556 A 10/1994
(Continued)

OTHER PUBLICATIONS

N. Waraporn, M. Sithiyavanich, H. Jiarawattanasawat and N. Pakchai, "Virtual Credit Cards on Mobile for M-Commerce Payment," 2009 IEEE International Conference on e-Business Engineering, 2009, pp. 241-246, doi: 10.1109/ICEBE.2009.40 (Year: 2009).*

*Primary Examiner* — Scott C Anderson
*Assistant Examiner* — James H Miller

(57) ABSTRACT

A server and method for processing a card-not-present transaction whereby a purchaser selects to use one or more friends' card to obtain a reward is disclosed. The server comprises at least a computer processor to: (i) receive, from a merchant server, a payment request including a contact mechanism for the friend(s); (ii) send a selection request to the friend(s) using the contact mechanism; (iii) receive, from the friend(s) a selection response including card number(s) eligible for the reward; (iv) request the issuer server(s) for authentication and blocking the amount; (v) track a cumulative amount dynamically and repeat steps (iii) and (iv) until equal to or greater than the payment amount; (vi) generate a virtual card number for one time use based on the card number(s); and (vii) send a payment response to the merchant server including the virtual card number for the purchaser to complete the transaction.

20 Claims, 10 Drawing Sheets

(51) Int. Cl.
  *G06Q 20/08* (2012.01)
  *G06Q 20/34* (2012.01)

(56) References Cited

U.S. PATENT DOCUMENTS

| | | | | |
|---|---|---|---|---|
| 7,567,934 | B2 | 7/2009 | Flitcroft et al. | |
| 7,606,764 | B1* | 10/2009 | Mancini | G06Q 20/10 |
| | | | | 705/17 |
| 2001/0056409 | A1* | 12/2001 | Bellovin | G06Q 20/385 |
| | | | | 705/64 |
| 2003/0028481 | A1* | 2/2003 | Flitcroft | G06Q 20/10 |
| | | | | 705/39 |
| 2009/0119181 | A1* | 5/2009 | Pratt | G06Q 20/322 |
| | | | | 705/17 |
| 2010/0100480 | A1* | 4/2010 | Altman | G06Q 10/10 |
| | | | | 705/40 |
| 2010/0114733 | A1* | 5/2010 | Collas | G06Q 30/0601 |
| | | | | 705/26.1 |
| 2011/0035673 | A1* | 2/2011 | Chou | H04M 1/27453 |
| | | | | 715/739 |
| 2013/0024371 | A1* | 1/2013 | Hariramani | G06Q 20/384 |
| | | | | 705/41 |
| 2013/0085938 | A1* | 4/2013 | Stone | G06Q 20/3572 |
| | | | | 705/41 |
| 2014/0019352 | A1 | 1/2014 | Shrivastava | |
| 2014/0067667 | A1* | 3/2014 | Blanco | G06Q 30/0601 |
| | | | | 705/41 |
| 2014/0081854 | A1* | 3/2014 | Sanchez | G06Q 20/3276 |
| | | | | 705/16 |
| 2014/0351127 | A1 | 11/2014 | McMullan et al. | |
| 2014/0351130 | A1* | 11/2014 | Cheek | G06Q 20/29 |
| | | | | 705/44 |
| 2015/0073988 | A1* | 3/2015 | Hosny | G06Q 20/12 |
| | | | | 705/44 |
| 2016/0034889 | A1* | 2/2016 | Downs | G06Q 20/382 |
| | | | | 705/26.41 |
| 2016/0335634 | A1* | 11/2016 | Flood | G06Q 20/409 |
| 2017/0032338 | A1* | 2/2017 | Szollar | G06Q 30/0226 |
| 2017/0323280 | A1* | 11/2017 | Desilva | G06Q 20/102 |

FOREIGN PATENT DOCUMENTS

| | | | |
|---|---|---|---|
| KR | 20160111255 A | * 9/2016 | |
| WO | 2016182915 A1 | 11/2016 | |
| WO | WO-2020046461 A1 | * 3/2020 | ........... G06K 7/1413 |

* cited by examiner

SYSTEM AND METHOD FOR PROCESSING A CARD-NOT-PRESENT PAYMENT TRANSACTION BY A PURCHASER USING A FRIEND'S CARD FOR OBTAINING A REWARD

CROSS-REFERENCE TO RELATED APPLICATION

This application claims priority to Singapore Patent Application No. 10201806753R, filed Aug. 8, 2018, entitled "System and Method for Processing a Card-Not-Present Payment Transaction by a Purchaser using a Friend's Card for Obtaining a Reward", the entirety of which is incorporated herein by reference.

FIELD OF THE INVENTION

The present invention generally relates to processing of card-not-present (CNP) payment transactions. In particular, the present invention relates to availing offers or rewards associated with a transaction using an eligible payment card of a friend or a third party cardholder.

BACKGROUND OF THE INVENTION

Often merchants provide offers and rewards as a part of a promotion or stock clearance sale. Sometimes, these offers and rewards are only applicable for payment transactions using a specific type of payment card (e.g. from a particular card provider). Further, the offers may be associated with limited brands of products or services offered by the merchant.

Sometimes a situation may arise when a user desires to purchase a product or service from a merchant and avail an offer, however, the user may not possess an eligible payment card for the offer. In such cases, the user may request to use a card of a friend or a relative, if they have an eligible payment card for the offer. Typically the friend or relative shares the card details via an open public channel such as over phone, email or text message. Otherwise, the friend or relative needs to physically enter such details into a merchant terminal or website. Both ways of sharing card details have their own drawbacks. In the first method, sharing the card details over an open public channel makes them prone to fraudulent misuse of sensitive data. Further, the friend or relative has to rely on the bona fide intention of the user when providing such sensitive information. However, there remains a risk that the user will misuse the card details for further transactions. In the second situation, disadvantageously the cardholder needs to be physically present at the site of the transaction to manually enter the card details into a user's computer or mobile phone. Additionally, there remains a risk that the user will obtain the card details and use them in future for unauthorized purposes.

Further, in an informal arrangement with a friend or relative, the user is not obligated to refund the payment amount to the friend or relative by a specific date. The friend or relative extends help to the user without any formal commitment on user's part to refund the friend or relative with the loaned amount within a particular date. Further, neither the user nor the cardholder enters an agreement on penalty terms on default by the user to refund the loaned amount by the agreed date. Therefore, for receiving the loaned amount, the card holder has to rely on trust with the user.

In relation to payment fraud, U.S. Pat. No. 7,567,934 discloses a credit card system having added feature of providing additional limited use credit card numbers and/or cards. These numbers/cards can be used for a single or limited use transaction thereby reducing the potential for fraudulent reuse of these numbers and/or cards. The card system may be used for "card remote" transaction such as by phone or internet and "card present" transactions such as at POS (point of sale) terminals. U.S. Pat. No. 6,598,031 discloses a secure payment transaction by generation of single use credit card number by a payment server based on encrypted information of a transaction card sent over a public network.

However, none of the above at least discloses the option of using a friend's or a third party cardholder's payment card by a user or purchaser for availing offers and rewards associated with a transaction securing the friend's or the third party cardholder's sensitive account information from fraudulent misuse. Further, none of the documents discloses an arrangement of assured return payment by the purchaser to the friend or cardholder.

In view of the above, it may be realised that there exists a need to provide an improved and secure mechanism for availing payment options of a friend or a third party cardholder without risking the security of the cardholder's sensitive information. Moreover, there also exists a need to provide an assured method of refund to the cardholder.

SUMMARY OF THE INVENTION

In general terms, the present disclosure proposes a computer system and computer-implemented method for processing a card-not-present payment transaction by a purchaser using a friend's card for obtaining a reward associated with the payment transaction.

In a first aspect of the present invention, there is provided a server for processing a card-not-present transaction whereby a purchaser selects to use at least one friend's card to obtain a reward. The server comprising at least a computer processor and a data storage device, the data storage device comprising instructions operative by the computer processor to:

(i) receive, from a merchant server, a payment request comprising a payment amount, a contact mechanism for the at least one friend and details of the reward associated with the transaction;

(ii) send a selection request using the contact mechanism for the at least one friend, the selection request comprising the details of the reward associated with the transaction, the payment amount and a list of one or more payment cards eligible for the reward;

(iii) receive, from the at least one friend a selection response comprising at least one card number for at least one payment card eligible for the reward, an amount specified by the at least one friend and authentication input for the at least one card number to enable authorization from an issuer server associated with the at least one card number;

(iv) request the at least one issuer server to block the amount using the at least one card number;

(v) track a cumulative amount dynamically upon collating the amount of each at least one selection response from the at least one friend and repeat steps (iii) and (iv) until the cumulative amount is equal to or greater than the payment amount;

(vi) generate a virtual card number for one time use based on the at least one card number; and (vii) send a payment response to the merchant server including the virtual card number for the purchaser to use to complete the transaction.

Thus, embodiments of the invention advantageously provide a purchaser with an option of using a friend's card to avail an offer or reward associated with a transaction made on a merchant App/website, in case the purchaser does not possess an eligible card for the offer/reward. Further, the described embodiments build on existing infrastructures to use payment cards belonging to one or more friends while making a transaction for availing an offer associated with an online purchase with easy implementation and minimal set-up costs.

In some embodiments, the data storage device may comprise further instructions operative by the processor to block a payment mechanism of the purchaser and transfer the amount during a pre-registered payment cycle to the at least one card number.

In some embodiments, the server may be further configured to debit the payment mechanism of the purchaser and credit the at least one card corresponding to the at least one friend based on the blocked payment mechanism of the purchaser and the pre-registered payment cycle of the at least one friend.

In some embodiments, the server may be further configured to receive the payment request based on a selection by the purchaser of at least one friend's card and the contact mechanism of the at least one friend on a merchant screen. The merchant screen may be a merchant application or a merchant website.

In some embodiments, the reward associated with the transaction may depend on one or more of a type of the payment card, an issuer bank associated with the payment card, a nature of a product or service being purchased, the payment amount and a time of the transaction.

In some embodiments, the contact mechanism for the at least one friend may comprise at least one of a contact number and a username for a social network platform.

In some embodiments, the payment request received from the merchant server may comprise an API (Application Programme Interface) call.

In some embodiments, the authorization may comprise verifying credentials of at least one friend's card and the corresponding authentication input against pre-registered information of the at least one friend with the corresponding issuer server.

In some embodiments, the virtual card number may correspond to a non-physical card such that details of the at least one friend's card are not provided to the purchaser.

In some embodiments, the virtual card number may correspond to a non-physical card having a pre-defined limit on validity duration and/or a pre-defined limit on a transaction amount.

In a second aspect of the present invention, there is described a computer implemented method for processing a card-not-present transaction whereby a purchaser selects to use at least one friend's card to obtain a reward. The method comprising:

(i) receiving, from a merchant server, a payment request comprising a payment amount, a contact mechanism for the at least one friend and details of the reward associated with the transaction;

(ii) sending a selection request using the contact mechanism for the at least one friend, the selection request comprising the details of the reward associated with the transaction, the payment amount and a list of one or more payment cards eligible for the reward;

(iii) receiving from the at least one friend a selection response comprising at least one card number for at least one payment card eligible for the reward, an amount specified by the at least one friend and authentication input for the at least one card number to enable authorization from an issuer server associated with the at least one card number;

(iv) requesting the at least one issuer server to block the amount of the at least one friend using the at least one card number;

(v) tracking a cumulative amount dynamically upon collating the amount of each at least one selection response from the at least one friend and repeating steps (iii) and (iv) until the cumulative amount is equal to or greater than the payment amount;

(vi) generating a virtual card number for one time use based on the at least one card number; and (vii) sending a payment response to the merchant server including the virtual card number for the purchaser to use to complete the transaction.

Embodiments of the invention advantageously enable a cardholder to share his/her card details with a friend who wishes to avail an offer/reward associated with a transaction with a merchant on a merchant App/website without disclosing sensitive payment card information such as a card number. Further, the described embodiments also ensure that the cardholder receives the payment amount back from the purchaser within a date specified by the cardholder himself. This advantageously provides more confidence to the cardholder against fraudulent misuse of sensitive payment card information and an assurance of return payment from the purchaser.

In some embodiments, the computer implemented method may further comprise blocking a payment mechanism of the purchaser and transferring the amount during a pre-registered payment cycle to the at least one card number.

In some embodiments, the computer implemented method may further comprise debiting the payment mechanism of the purchaser and crediting the at least one card corresponding to the at least one friend based on the blocked payment mechanism of the purchaser and the pre-registered payment cycle of the at least one friend.

In some embodiments, the computer implemented method may further comprise receiving the payment request based on a selection by the purchaser of at least one friend's card and the contact mechanism of the at least one friend on a merchant screen.

In some embodiments, the payment request received from the merchant server may comprise an API (Application Programme Interface) call.

In some embodiments, the authorization may comprise verifying credentials of at least one friend's card and the corresponding authentication input against pre-registered information of the at least one friend with the corresponding issuer server.

In some embodiments, the virtual card number may correspond to a non-physical card such that details of the at least one friend's card are not provided to the purchaser.

In some embodiments, the virtual card number may correspond to a non-physical card having a pre-defined limit on validity duration and/or a pre-defined limit on a transaction amount.

In some embodiments, the computer implemented method may further comprise tracking the cumulative amount until a payment session is expired.

Other desirable features and characteristics will become apparent from the subsequent detailed description and the appended claims, taken in conjunction with the accompanying drawings of the disclosure. Moreover, within the scope of this disclosure it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Non-limiting embodiments of the invention will now be described for the sake of example only, with reference to the following drawings in which.

DETAILED DESCRIPTION OF THE EMBODIMENT

As used herein, the term "account" refers to any form of arrangement that a customer has with an institution that allows the customer to deposit and/or withdraw funds. An account can be a deposit account, a credit card account, a debit card account, a current account, a saving account, an overdraft account, an electronic wallet account or any other type of account offered by the institution. Furthermore, the account may be a loan account in which case the customer owes money to the institution. In some embodiments, an account may be associated with a payment card, such as a credit card, a debit card, a prepaid card, a charge card, a membership card, a promotional card, a frequent flyer card, an identification card, a gift card, and/or any other device that may hold account information, such as mobile phones, smartphones, personal digital assistants (PDAs), key fobs, transponder devices, NFC-enabled devices, and/or computers.

The term "institution" is not necessarily limited to organizations which are legally constituted as banks, since in some jurisdictions other organizations may be permitted to maintain accounts. For example, an institution associated with an acquirer or an issuer can be one of the following: a bank, a financial technology company, or a financial institution.

The terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Figure 1:
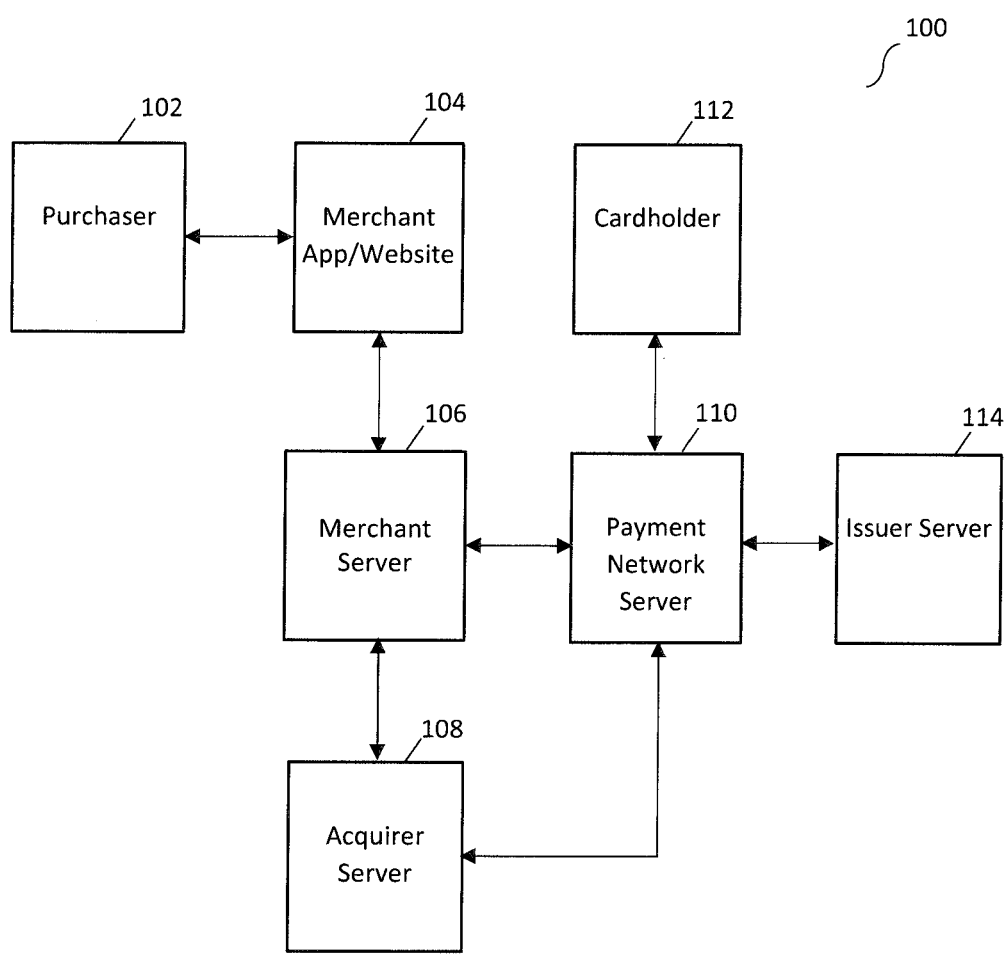
FIG. 1 shows a computerised network for processing a card-not-present payment transaction by a purchaser using at least one friend's card to obtain a reward on a merchant App/website in accordance with a first embodiment of the invention.

Disclosed herein is a method of making payment on a merchant's App (Mobile Application) or website using a friend's (cardholder's) payment card FIG. 1 is a schematic diagram of a computerized network 100 for processing such a card-not-present transaction according to a first embodiment of the present invention. A purchaser 102 with a desire to avail rewards and offers associated with a range of products and services provided by a merchant for a transaction (also referred to as a payment transaction) using selected eligible payment cards, engages in a payment transaction with the merchant through a merchant application (App) or website 104. Typically, the purchaser 102 is not qualified to avail such offers if he/she does not possess an eligible card specified by the merchant application or website 104. However, in the present embodiment, the purchaser 102 is provided with a payment option of using a friend's card which is eligible for the reward as specified by the merchant application or website 104. For example, Flipkart may offer an instant 10 percent discount on payments via HDFC bank debit and credit cards as part of shopping deals available during Flipkart's "New Pinch Days" sale valid for a particular week of the year. The offer may be applicable across all categories of products and services except a few selected products and services. Further the offer may be applicable on a transaction made by all HDFC debit and credit cards except corporate and commercial cards. The offer also may be excluded for transactions made through Internet banking. The purchaser 102 is typically a person or group of persons who access and use the merchant App/website 104 for online transactions. The purchaser 102 may access the merchant App/website 104 through a communication device such as a personal computer (PC), a smartphone, a laptop, a tablet and so forth. The merchant App/website 104 may be an application corresponding to a product manufacturer, a service provider, an online merchant of products and services and so forth. The offer may be related to discount on MRP (maximum retail price), volume discount, discount on total purchase, cash back offer, gift coupons, reward points, redeemable points and so forth.

For the sake of description, a specific situation is taken by way of example where the purchaser 102 desires to avail such offers on purchase of a wristwatch from the merchant App 104 accessible on a mobile device during a specific sale period using an eligible card specified by the merchant App 104. However, the purchaser 102 does not hold a payment card eligible for the offer. It should be understood that the situation is not limited to purchase of only wristwatches and may be applicable to any products or services covered under the offer and the purchaser 102 may access a website of the merchant instead of the merchant App 104 for the purpose of the transaction.

According to the present embodiment, the purchaser 102 is provided with a payment option to use a friend's (cardholder's 112) card which is eligible for the offer as specified by the merchant App 104. This feature may be implemented in various ways, however, in this embodiment a payment option "Use Friend's Card" is provided by the merchant App 104 along with other payment options such as Debit card, Credit card, Internet Banking, Cash on Delivery and so forth. The purchaser 102 may advantageously utilise the "Use Friend's Card" option to avail the offer for the transaction via the merchant App 104. Further, it should be understood that the purchaser 102 may choose to use a relative's card, a neighbour's card, a colleague's card, a spouse's card and so forth but for ease of reference all of these will be considered to be within the definition of a friend's card, as the eligible card for the transaction.

The merchant App 104 is configured to receive a contact mechanism of the cardholder 112 from the purchaser 102. The cardholder 112 is typically a person who owns the eligible payment card associated with the offer. In this embodiment the contact mechanism is a mobile number of the cardholder 112. However, the contact mechanism may refer to a username for a social network platform, an email address, a telephone number and so forth.

The merchant App 104 is controlled by a merchant server 106. Typically the merchant server 106 enables the purchaser 102 to access the merchant App 104 on the purchaser's mobile device. The merchant server 106 is also configured to receive user activity on the merchant App 104 and to take necessary actions based on the user's activity. The merchant server 106 is also coupled with an acquirer server 108 for collecting a payment amount and completing a settlement process on behalf of the merchant.

The merchant server 106 is further communicatively coupled with a payment network server 110 for processing the payment transaction. The payment network server 110 communicates with the cardholder 112 on receipt of a payment request from the merchant server 106 including the transaction details and payment details. Upon receipt of the cardholder's 112 eligible card number, amount and authentication details, the payment network server 110 requests the necessary issuer authorization. Examples of the payment network may include Mastercard, VISA, American Express and so forth. Further, it should be understood that the payment network server 110 may be connected with multiple merchant servers in addition to the merchant server 106. Furthermore, the payment network server 110 is also connected with the acquirer server 108 for completing the settlement process after the payment transaction has become successful. It should be apparent that the payment network server 110 may be connected with multiple acquirer servers in addition to the acquirer server 108.

The payment network server 110 is further communicatively connected with an issuer server 114 associated with the cardholder's 112 eligible card. The issuer server 114 is the provider of the eligible payment card to the cardholder 112. Further, the issuer server 114 performs authorization of the cardholder's 112 eligible card based on a request from the payment network server 110. It should be apparent that the payment network server 110 may be connected with multiple issuer servers in addition to the issuer server 114.

Figure 2:
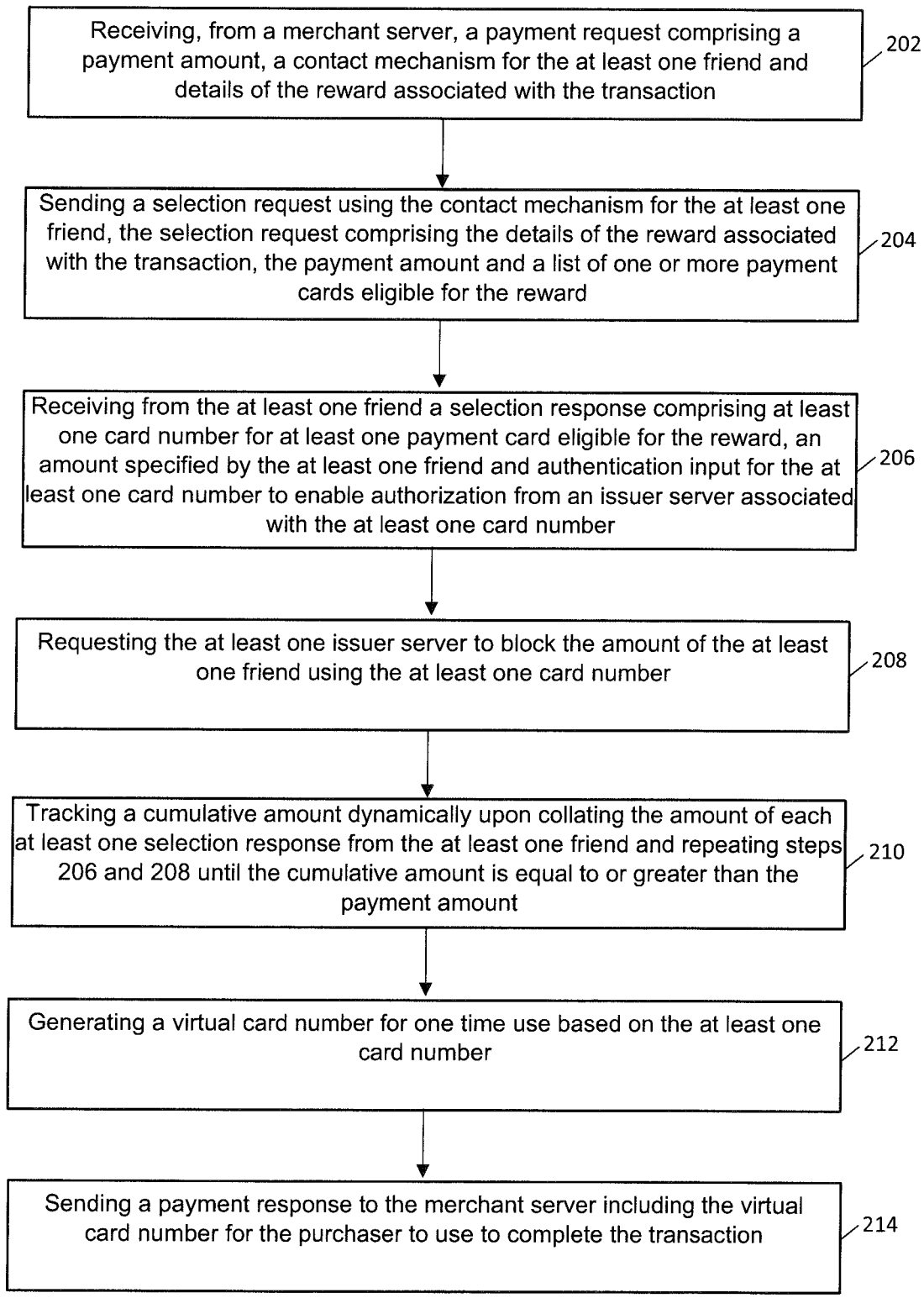
FIG. 2 is a flowchart illustrating a method for processing a card-not-present payment transaction by a purchaser using at least one friend's card to obtain a reward on a merchant App/website using the computerised network of FIG. 1.

FIG. 2 is a flowchart illustrating the method for processing the card-not-present payment transaction by the purchaser 102 using the cardholder's 112 (friend's) payment card to obtain the reward on the merchant App 104. Initially at step 202, the payment network server 110 receives the payment request comprising the payment amount, the contact mechanism for the cardholder 112 (friend) and details of the reward associated with the transaction from the merchant server 106. After receiving the payment request, the payment network server 110 sends a selection request using the contact mechanism for the cardholder 112 at step 204. The selection request includes the details of the reward associated with the transaction, the payment amount and a list of one or more payment cards eligible for the reward. Next a selection response is received at the payment network server 110 from the cardholder 112 at step 206. The selection response includes a card number for one payment card eligible for the reward, an amount specified by the cardholder 112 (friend) and authentication input for the card number to enable authorization from an issuer server associated with the card number. It should be understood that the selection response may be received from multiple cardholders 112 (friends) if the purchaser selects a contact mechanism for more than one friend. In that case, it should be appreciated that multiple eligible card numbers along with respective authentication inputs may be received from the multiple cardholders 112 (friends). Upon receiving the selection response, the payment network server 110 requests the issuer server 114 to block the amount specified by the cardholder 112 using the card number at step 208. It should be understood that in case of multiple card numbers received from the multiple cardholders 112, the payment network server 110 may request the respective issuer servers 114 to block the amount specified by the each of the cardholders 112. Next at step 210, the payment network server 110 checks if the amount specified by the cardholder 112 is equal to or greater than the payment amount. Further it should be understood that for multiple cardholders 112, the payment network server 110 may dynamically track a cumulative amount upon collating the specified amount by each cardholder 112 and check if the cumulative amount is equal to or greater than the payment amount. When the amount specified by the cardholder 112 (or the cumulative amount from the multiple cardholders 112) becomes at least equal to the payment amount, the payment network server 110 generates a virtual card number for one time use based on the card number provided by the cardholder 112 (or the multiple card numbers provided by the multiple cardholders 112) at step 212. Finally, at step 214, the payment network server 110 sends a payment response to the merchant server 106 including the virtual card number. The merchant server 106 then forwards the virtual card number to the merchant App 104 for the use of the purchaser 102 to avail the desired reward associated with the transaction.

Figure 3A:
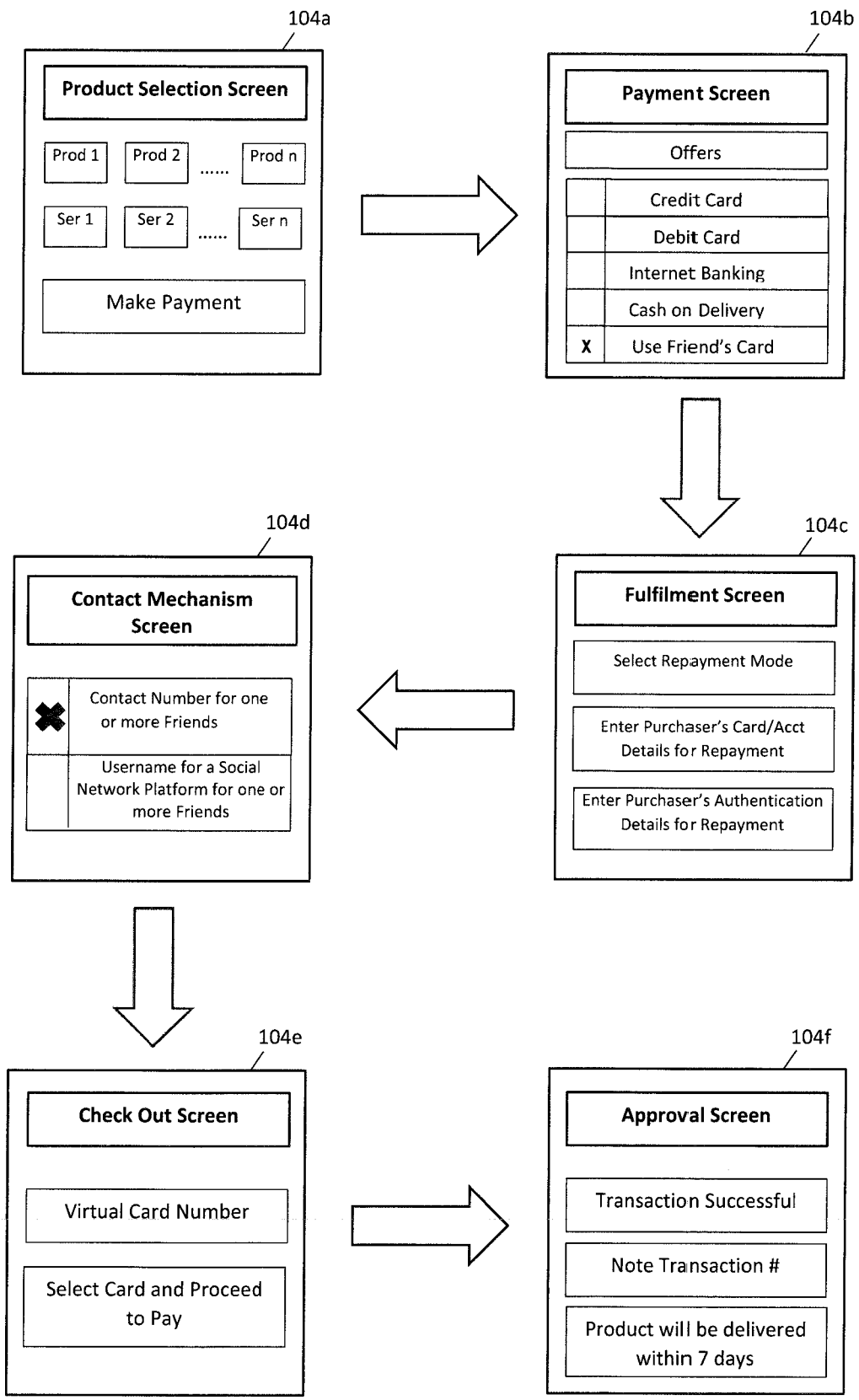
FIG. 3a shows the steps of a making a payment transaction by the purchaser on the merchant App of FIG. 1, which is performed by a payment network server comprised in the computerised network of FIG. 1.

FIG. 3a shows steps of a method of making the payment transaction by the purchaser on the merchant App 104. Initially the purchaser 102 accesses the merchant App 104 on his/her mobile device. Then the purchaser selects the wristwatch (or other product he/she wishes to purchase) from a product selection screen 104a of the merchant App 104. After selecting the wristwatch, the purchaser 102 proceeds to make payment on a payment screen 104b. As the purchaser 102 does not hold a payment card eligible for the offer, he selects the payment option "Use Friend's Card" from the payment screen 104b. Then the purchaser is directed to a fulfilment screen 104c. At the fulfilment screen 104c, the purchaser 102 enters his/her card/account details to be used to repay the friend along with his/her authentication details (e.g. CCV) and selects the secure payment mode. Next, the purchaser 102 is directed to a contact mechanism screen 104d for selecting a contact mechanism of a friend or a group of friends to ask if he/she can use one or more of their eligible payment cards for the reward. In this embodiment, the purchaser 102 selects to use a contact number of a friend. In other embodiments, the user may select to enter a username for a social media platform for one or more friends. After selecting the present contact mechanism of the friend, the purchaser 102 enters a contact number of the friend via the contact mechanism screen 104d. Based on the "Use Friend's Card" request, the merchant server 106 communicates with the payment network server 110 for processing the payment request and receives a virtual card number from the payment network server 110 (as will be explained in more detail below). The virtual card number is presented at a check out screen 104e as response to the "Use Friend's Card" request. The process of sending a "Use Friend's card" request by the purchaser 102 to the merchant App 104 and receiving a "Use Friend's Card" response is explained with reference to FIG. 4b. At the checkout screen 104e, the purchaser 102 selects to use the virtual card number in place of the friend's card, which is eligible for the offer associated with the transaction of purchasing the wristwatch and proceeds to pay using the friend's card. Finally at an approval screen 104f, the purchaser receives a transaction successful message with a transaction number. Also, from the approval screen 104f, the purchaser 102 receives information on the delivery date of the wristwatch.

Figure 3B:
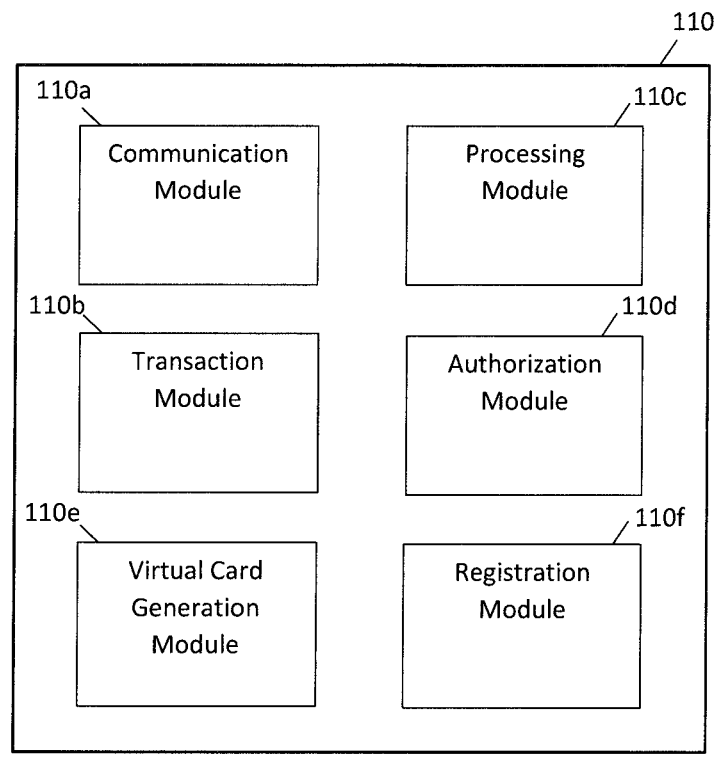
FIG. 3b shows schematically the structure of the payment network server of FIG. 1.

FIG. 3b shows schematically the structure of the payment network server 110 which processes the transaction by the purchaser 102 to buy the wristwatch using the friend's payment card. The payment network server 110 includes a communication module 110a, a transaction module 110b, a processing module 110c, an authorisation module 110d, a virtual card generation module 110e and a registration module 110f.

The communication module 110a is configured to enable the payment network server 110 to communicate with at least the merchant server 106 and the issuer server 114. In some embodiments, the communication module 110a may be configured to communicate with the merchant server 106 via the acquirer server 108. Based on the purchaser's 102 request to use a friend's card for the transaction, the merchant server 106 generates a payment request and forwards to the communication module 110a of the payment network server 110. After the payment network server 110 successfully processes the transaction, the payment network server 110 sends a payment response to the merchant server 106. The process of payment request and payment response between the merchant server 106 and the payment network server 110 is explained with reference to FIG. 4c.

The transaction module 110b is configured to work in connection with the communication module 110a to receive the payment request. Further, the transaction module 110b is configured to debit a payment amount from the friend's card via the issuer server 114 and to credit the payment amount to a merchant account with the acquirer server 108.

The processing module 110c is configured to process the payment request by contacting the cardholder 112 (friend) via his/her contact number and to request for selection of an eligible card number with amount agreed to lend the purchaser and necessary verification for the payment transaction. Upon receiving the response of the selection request from the cardholder 112, the payment network server 110 further processes the payment request by conducting necessary issuer authorization and virtual card number generation. The process of a selection request and selection response between the payment network server 110 and the cardholder 112 is explained with reference to FIG. 4d.

The authorization module 110d is configured to forward an authorization request to the issuer server 114 and to receive an issuer authorization response indicating if the payment request is authorized or refused from the issuer server 114. The process of authorization request and response is explained with reference to FIG. 4e.

After successful authorization, the virtual card generation module 110e is configured to generate the one time use virtual card number based on the cardholder's 112 eligible card number. The credit limit associated with the virtual card number is set as the payment amount of the transaction. The virtual card number is then sent to the merchant server 106 for the purchaser's 102 use to complete the payment transaction. In this way, the friend's card details are never sent to the purchaser and therefore they remain secure.

The registration module 110f is configured to receive a registration request from the cardholder 112 for registering himself/herself for participating in a "Use Friend's card" payment service wherein he/she is willing to lend the payment amount (or part thereof) to a friend (the purchaser 102) without disclosing his/her sensitive account information. The cardholder 112 also registers his/her desired payment cycle with the payment network server 110 in order to receive the repayment from the friend within a specified timeframe. The process of sending a registration request by the cardholder 112 to the payment network server 110 and receiving a registration response is explained with reference to FIG. 4a.

Figure 4A:
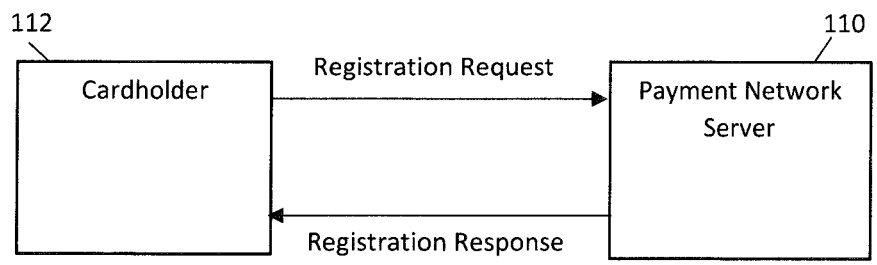
FIG. 4a shows schematically a registration process of a cardholder with the payment network server of FIG. 3b.

FIG. 4a shows schematically the registration process of the cardholder 112 with the payment network server 110. As explained above, if the cardholder 112 is willing to lend the payment amount or part of the payment amount to a friend, the cardholder needs to first register himself/herself with the payment network server 110. To this end, the cardholder 112 sends the registration request to the payment network server 110. The cardholder 112 may communicate with the payment network server 110 through a commonly available communication channel such as via a data network (e.g. internet), a voice network (e.g. mobile call, phone call) and so forth. The cardholder 112 may optionally access a website or App of the payment network server 110 for the registration process. Upon receiving the registration request, the cardholder 112 is typically asked to select a payment cycle for receiving a repayment by the payment network server 110. The cardholder may select a date or opt for real time payment as per settlement date of a payment card. The registration request may also include recording a preferred contact mechanism of the cardholder. For example, the preferred contact mechanism may be a mobile number, a phone number, an email address, a username of a social network platform and so forth. After storing the required details of the cardholder 112, the registration process is successfully completed by the payment network server 110 upon sending the registration response to the cardholder 112.

Figure 4B:
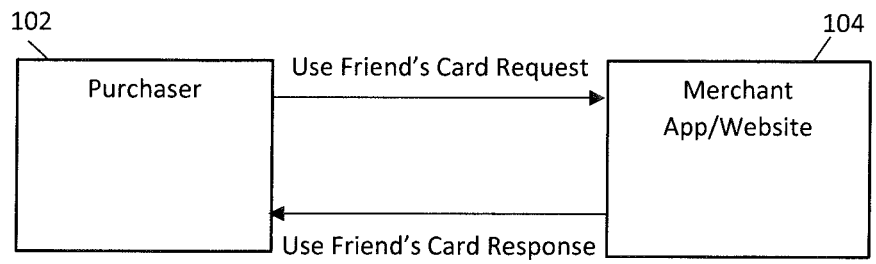
FIG. 4b shows schematically a process of requesting to use a friend's card between a purchaser and the merchant App of FIG. 2.

FIG. 4b shows schematically a process of requesting to use a friend's card between the purchaser 102 and the merchant App 104. In this embodiment, the purchaser 102 does not hold an eligible payment card for the reward associated with the transaction, therefore, the purchaser 102 selects the option "Use Friend's Card" for making the payment and availing the reward from the merchant App 104. As explained with reference to FIG. 3a, the purchaser sends a "Use Friend's Card" request by selecting this option at the payment screen 104b of the merchant App 104. The "Use Friend's Card" request may require the repayment details such as repayment mode, repayment card/account details, necessary authentication details and so forth at the fulfilment screen 104c. Further, the "Use Friend's Card" request also includes providing a contact mechanism of one or more friends at contact mechanism screen 104d. The contact mechanism may be a contact number, username for a social network platform, an email address and so forth. Upon receiving the "Use Friend's Card" request the merchant App 104 forwards the request to the payment network server 110 via the merchant server 106 for processing the request. After the request is successfully processed, the merchant App 104 receives a virtual card number derived based on the eligible payment card numbers of the one or more friends from the merchant server 106. The merchant App 104 shows the virtual card number to the purchaser 102 as the "Use Friend's Card" response. Then the purchaser 102 uses the virtual card number for making the payment.

Figure 4C:
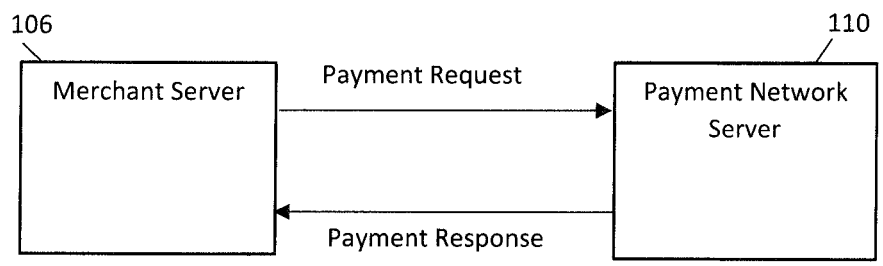
FIG. 4c shows schematically a payment transaction process between a merchant server and the payment network server of FIG. 3b.

FIG. 4c shows schematically a payment transaction process between the merchant server 106 and the payment network server 110. Once the purchaser selects the "Use Friend's Card" option and provides a necessary contact mechanism of the one or more friends, the merchant server 106 sends the payment request as an API call to the payment network server 110. The payment request includes the payment amount, the contact mechanism of the one or more friends and the rewards associated with the transaction. The payment network server 110 performs the necessary processing (discussed in the later section) of the payment request and after successfully processing the payment request, the payment network server 110 sends a payment response to the merchant server 106 in form of API response. The payment response includes a virtual card number for the use of the purchaser 102 to complete the transaction.

Figure 4D:
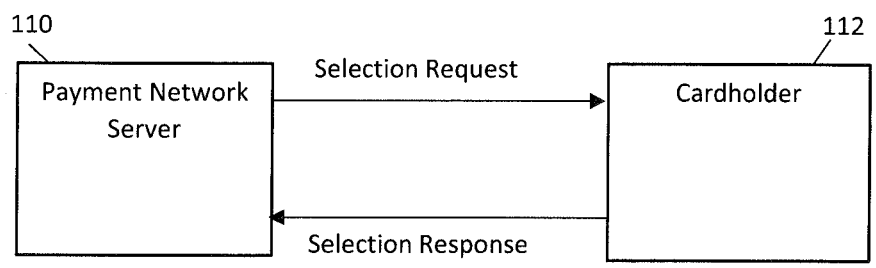
FIG. 4d shows schematically a card selection process between the payment network server of FIG. 3b and the cardholder.

FIG. 4d shows schematically a card selection process between the payment network server 110 and the cardholder 112. After receiving the payment request from the merchant server 106, the payment network server 110 sends the selection request to the one or more cardholders 112 via the contact mechanism selected by the purchaser 102. The selection request includes the details of the reward associated with the transaction, the payment amount and a list of cards eligible for the reward. Each of the cardholders 112 sends a selection response back to the payment network server 110 via the same contact mechanism. The selection response contains a card number of a payment card eligible for the reward, necessary authentication details required for the payment card and an amount specified by the each of the cardholder 112.

Figure 4E:
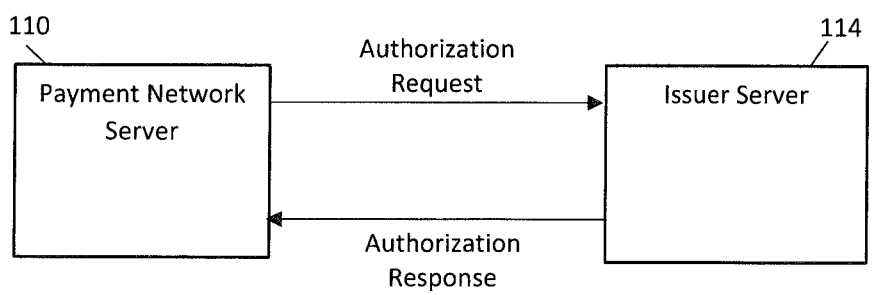
FIG. 4e shows schematically a process of authorization between the payment network server of FIG. 3b and an issuer server associated with a payment card of the cardholder.

FIG. 4e shows schematically a process of authorization between the payment network server 110 and the issuer server 114 associated with a payment card of the one of the cardholders 112. Upon receiving the selection response from each of the cardholders 112, the payment network server 110 sends the authorization request to each issuer server 114 corresponding to a payment card of each cardholder 112. The authorization request includes the card number, the authentication details and the amount specified by each cardholder 112 for the verification of the issuer server 114. The authorization request may be sent via a private network or a secure network between the payment network server 110 and the issuer server 114. After successful authentication, the issuer server 114 blocks the amount corresponding to the card number of each of the cardholders 112 and sends the authorization response to the payment network server 110. The authorization response may include authorization successful or failure message based on the outcome of the authorization.

Figure 5:
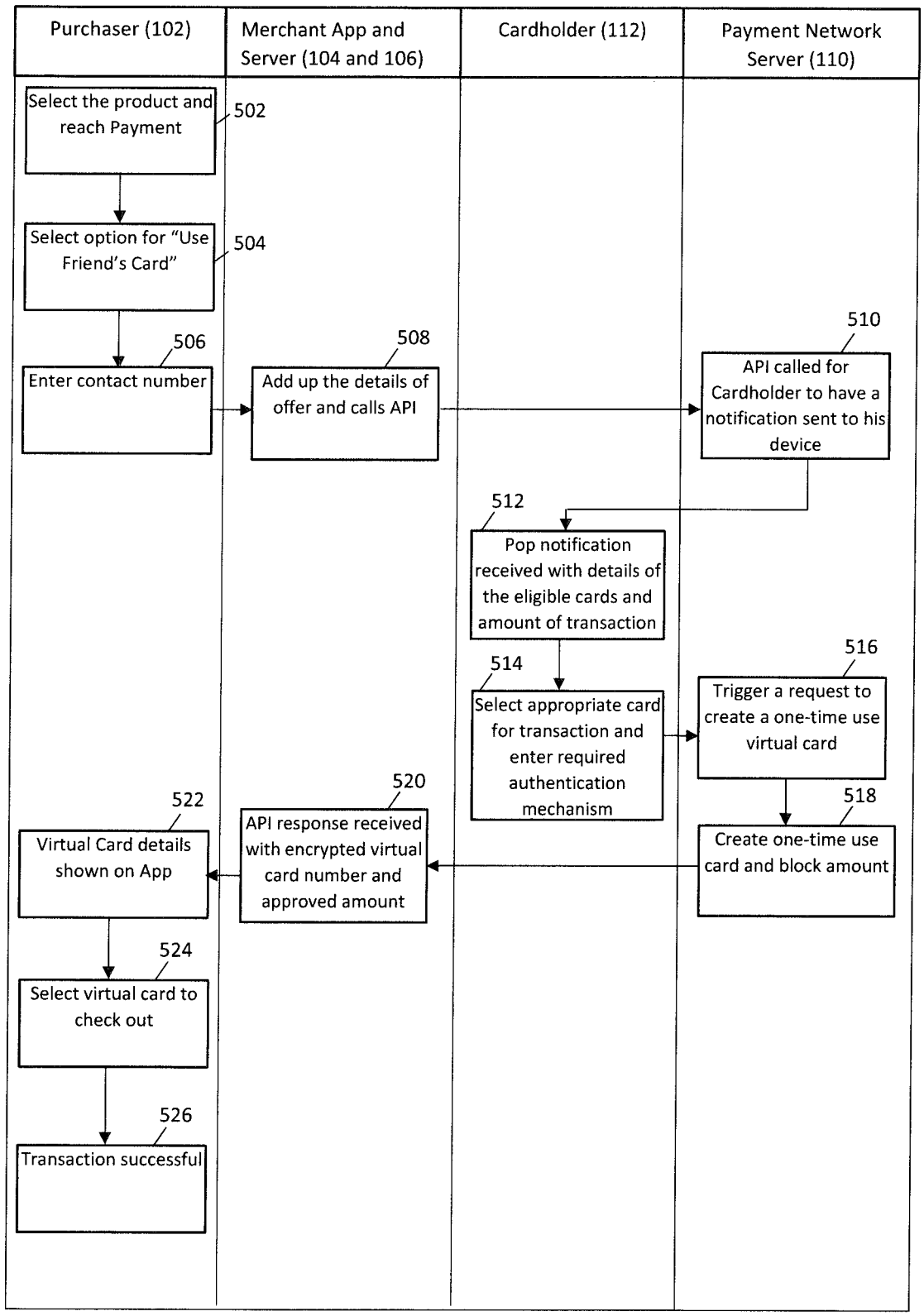
FIG. 5 shows schematically the steps of processing a card-not-present payment transaction using the computerized network of FIG. 1 by a purchaser using one friend's card to obtain a reward on a merchant App according to one embodiment.

FIG. 5 is a flowchart illustrating the method of processing the payment transaction made by the purchaser 102 on the merchant App 104 for availing the offer in purchasing the wristwatch using the cardholder's 112 (friend's) card. Initially at step 502, the purchaser 102 selects the desired wristwatch on the merchant's App 104. The merchant app 104 may provide different searching options such as search by brands, search by price, search by types, for example, watches for men or women, leather bands or metal bands and so forth. Once the desired wristwatch is selected, the purchaser 102 moves to the payment section of the merchant App 104. Since the purchaser 102 does not possess an eligible payment card to avail the offer, he selects the option "Use Friend's Card" at step 504 to use a friend's card which is qualified for the offer. Upon selecting the option "Use Friend's Card", the purchaser 102 is directed to the next section where a contact mechanism of the cardholder 112 needs to be entered at step 506. As explained before in this embodiment, the purchaser 102 enters a mobile number of the cardholder 112. The purchaser 102 uses the mobile number of the cardholder 112 which is pre-registered against the cardholder's (112) eligible payment card.

Upon receiving the purchaser's (102) selection of "Use Friend's Card" as the payment option and input of the cardholder's (112) mobile number, the merchant App 104 adds up the details of the eligible offers associated with the transaction and forwards a payment request to the merchant server 106 to make an API (Application Programme Interface) call at step 508. The merchant server 106 then makes the API call to the payment network server 110 with the payment request. The payment request includes information on the payment amount, the offers associated with the transaction and the mobile number of the cardholder 112.

Next the payment network server 110 processes the payment request through the API at step 510 and sends the selection request to the cardholder 112 at his mobile number as entered by the purchaser 102. The selection request includes details of offers associated with the transaction, the payment amount of the transaction and the details of the cards eligible for the offer.

The cardholder 112 receives the selection request at his mobile number at step 512. The selection request is received via a text message in this embodiment. The selection request may be received via other modes such as email notification, push message, a mobile call and so forth. Upon receiving the selection request, the cardholder 112 reviews the transaction details, offer detail and transaction amount. After the cardholder 112 agrees to the payment request (i.e. agrees to loan the payment amount in full), he selects one of his cards that is eligible for the offer as specified by the merchant App 104 and enters the necessary authentication details as an approval to the selection request at step 514. The authentication details include a security pin corresponding to a selected payment card of the cardholder 112, according to this embodiment. However, it should be understood that the authentication details may include 3D security pin, OTP (one time password), CVV (Card Verification Value) number, biometric and so forth.

The approval of the selection request is received at the payment network server 110 as a selection response from the cardholder 112. Upon receiving the selection response from the cardholder 112, the payment network server 110 requests the issuer server 114 associated with the eligible payment card of the cardholder 112 to perform necessary authentication. The authentication includes verifying the credentials and authentication details of the cardholder with a pre-registered record with the issuer server 114. Upon successful authorization, the issuer server 114 sends an authorization response approval to the payment network server 110.

On receiving the authorization response, the payment network server 110 generates the virtual card number for one time use based on the cardholder's 112 eligible card details at step 516. The virtual card number typically relates to an online card number for which there exists no associated physical card. In this embodiment, the virtual card number is also limited for one time use. Further, the virtual card number does not contain any sensitive account information of the cardholder 112, hence it is completely safe to transmit the virtual card number over a public network (e.g. internet) as it is impossible to retrieve any of the cardholder's 112 sensitive information from the virtual card number. After, generating the one time use virtual card number, the payment network server 110 also blocks the credit limit (spending limit) of the virtual card number to the amount of the payment transaction at step 518. Further, the validity period of the virtual card number also may be specified by the cardholder 112. Once the single time use virtual card number is generated and the credit limit is set to the payment transaction amount, it advantageously provides confidence to the cardholder 112 to share such virtual card details with the purchaser 102 for making the card-not-present transaction.

Next at step 520, a response to the payment request is received at the merchant server 106 via an API response from the payment network server 110 containing the virtual card number. The merchant server 106 then forwards the virtual card number to the merchant app 104 for the preview of the purchaser 102 at step 522.

Upon receiving the virtual card details, the purchaser 102 selects the virtual card number of the cardholder 112 as payment option at the check-out stage of the payment transaction at step 524. Finally, the merchant App 104 accepts the virtual card number of the cardholder 112 and processes the payment transaction and provides the purchaser 102 the applicable offer on the purchase of the wristwatch from the merchant app 104 at step 526. As a result of a successful transaction, the acquirer server 108 collects the payment amount from the cardholder's 112 account.

Figure 6:
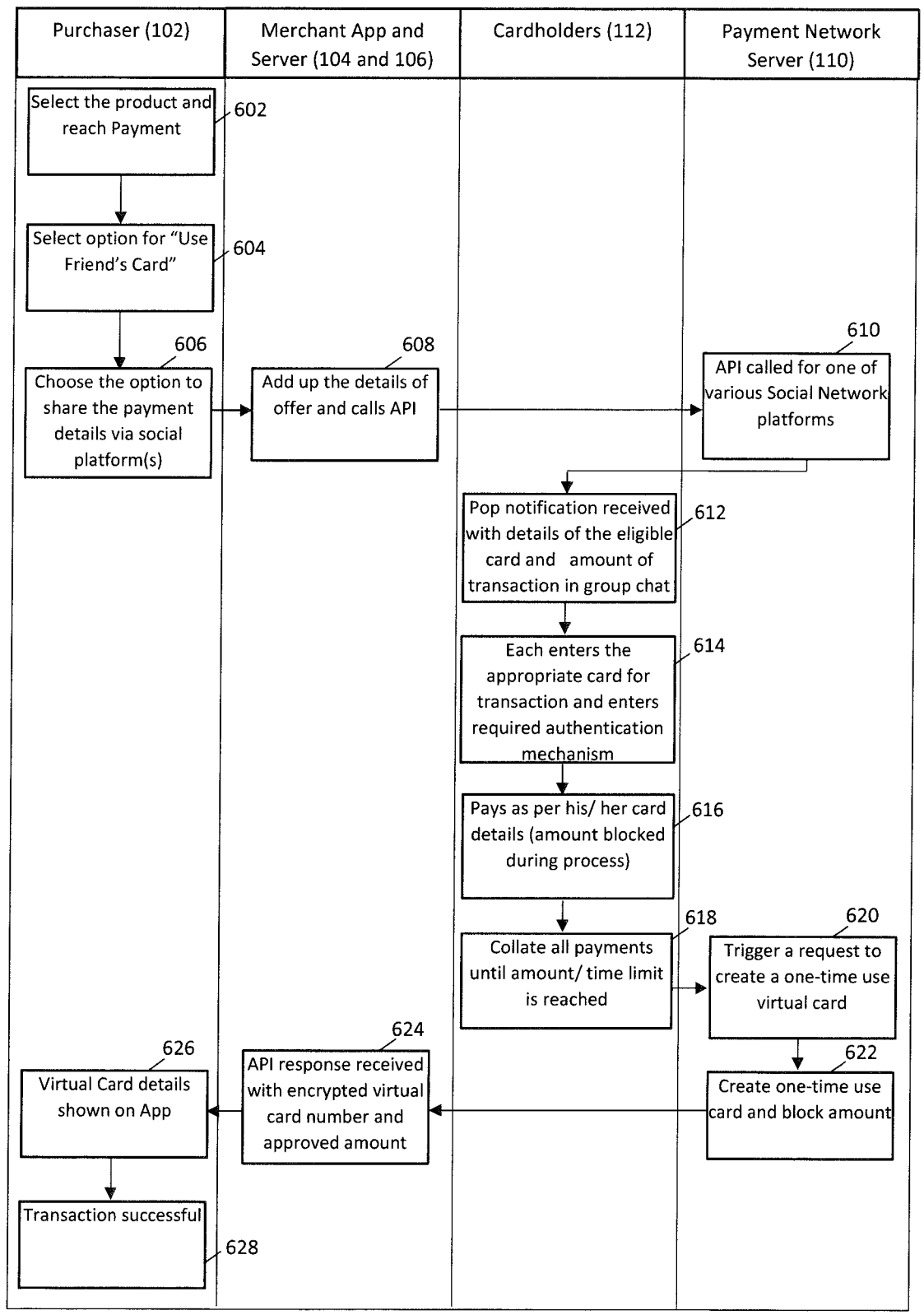
FIG. 6 shows schematically the steps of processing a card-not-present payment transaction using the computerized network of FIG. 1 by a purchaser using at least one friend's card to obtain a reward on a merchant App according to another embodiment.

In the first embodiment of the invention described above, the purchaser 102 uses a payment card of a single friend (cardholder 112) who possesses an eligible payment card for availing the offer. In a second embodiment of the invention the purchaser 102 uses eligible payment cards of multiple friends (multiple cardholders 112) for the card-not-present transaction. FIG. 6 is a flowchart illustrating a method of processing a card-not present payment transaction by the purchaser 102 on the merchant App 104 using multiple friends' eligible payment cards. The purchaser 102 may consider using the eligible cards of multiple friends when the product or service is of higher cost and it would be inappropriate to ask for such a high amount from a single friend. For the sake of description a specific case is taken by way of example when the purchaser 102 desires to purchase a washing machine from the merchant App 104 using multiple friends' 112 eligible cards for availing the offer. Initially at step 602, the purchaser 102 selects the washing machine from the merchant App 104. Next at the payment stage at step 604, the purchaser 102 selects the "Use Friend's Card" option for making the payment. In this embodiment, the merchant App 104 provides the purchaser 102 with options to select the appropriate contact mechanism of the friends whose cards the purchaser 102 desires to use for the payment transaction. The purchaser 102 choses a social network platform as the contact mechanism for the friends. In this embodiment, the purchaser selects a Whats App group as the contact mechanism at step 606. However, it should be understood that the social network platform may include, Facebook, Twitter, Linked in or any other social media platforms.

The merchant App 104 associates the offer details applicable to the purchase of the washing machine from the merchant App 104. The transaction details are then forwarded to the merchant server 106. The merchant server 106 sends a payment request in the form of an API call to the payment network server 110 at step 608. Based on the payment request, the payment network server 110 sends a selection request to the Whats app group at step 610 as selected by the purchaser 102. The selection request includes the payment amount, the offer detail related to the transaction and the list of cards eligible for the offer.

Next at step 612, the selected Whats App group receives a selection request notification detailing the transaction details, the payment amount, the offer detail and the list of eligible cards. The selection request may be received as a pop notification in the Whats App group. Receiving the transaction notification at the Whats App group, each interested group members (friends) 112 may click on a link to enter the card details and corresponding authentication details of respective eligible cards at step 614. Further, each interested group member 112 selects an approved amount as a contribution from his/her side. After each interested group member has provided his/her card details and the approved amount, the payment network server 110 blocks the approved amount via respective issuer servers and dynamically tracks the cumulative amount to collect the payment amount at step 616. This process is repeated until the entire payment amount is collected or a payment session is expired, based on whichever is earlier. At step 618, the total approved amounts for each interested group members 112 are collated to collect the payment amount required for the transaction.

Based on the collated payment amount of each interested group members 112 and individual card details the payment network server 110 generates a single virtual card number for one time use at step 620. At this stage, the payment network server 110 also requests for the authorization of the individual payment cards of the interested group members 112 with the respective issuer servers 114. The payment network server 110 also sets the credit limit (spending limit) of the one-time use virtual card number to the payment amount at step 622 and sends the response to the payment request to the merchant server 106 including the virtual card number.

At step 624, the merchant server 106 receives the payment response as an API response with the virtual card number. In this embodiment, the virtual card number is received as an encrypted card number. The merchant server 106 decrypts the encrypted virtual card number and sends the virtual card number to the merchant App 104 for display to the purchaser 102 at step 626. Finally at step 628, the purchaser 102 selects the displayed virtual card number as the payment mechanism for the purchase of the washing machine from the merchant App 104 to successfully complete the transaction and avail the applicable offer on the transaction. Upon successful transaction, the acquirer server 108 collects the approved amount from each cardholder's 112 account.

Figure 7:
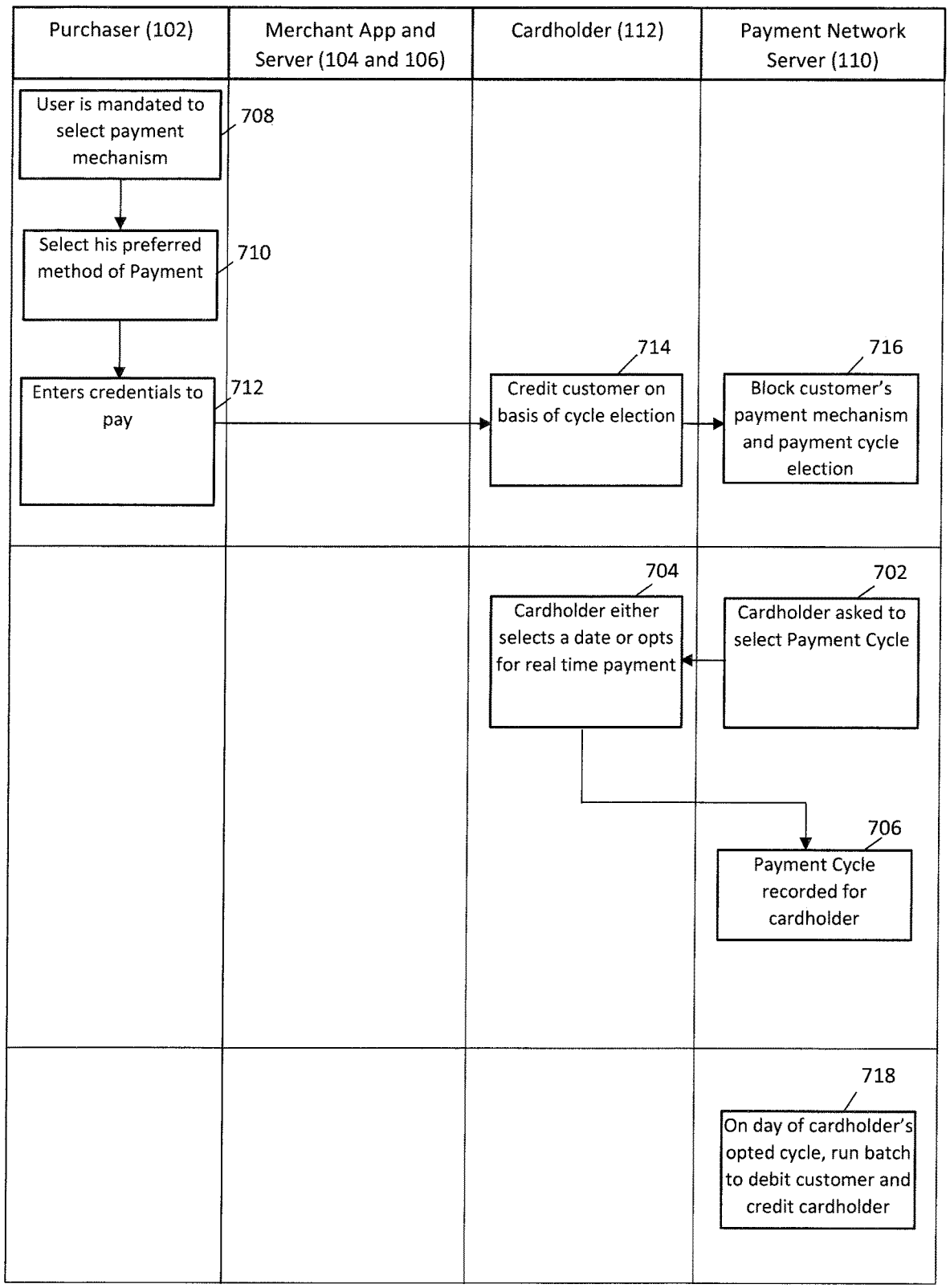
FIG. 7 shows schematically steps of a settlement process between the purchaser and the cardholder(s)

The present invention also addresses the issue of repayment from the purchaser 102 to the single or multiple cardholders 112 through a payment settlement process. FIG. 7 is a flow diagram illustrating the repayment and settlement process according to both first and second embodiments. Initially each cardholder 112 registers himself with the payment network server 110 for providing his service to allow the purchaser 102 to use his card number for the transaction, as a friend. In the beginning of the registration process at step 702, the payment network server 110 invites each cardholder 112 to select a payment cycle for the repayment. Each cardholder 112 selects the desired payment cycle according to his convenience at step 704. A cardholder 112 may also select a specific date for acquiring the approved amount from the purchaser 102. Alternatively, a cardholder 112 may select a real time payment such that the approved amount is credited to his card account on the basis of the payment cycle of his payment card. At step 706, the payment network server 110 registers the selected payment cycle for each cardholder 112 and stores the data for future use.

At the time of a card-not-present transaction on the merchant App 104, the purchaser 102 is directed to the fulfilment screen 104c once the purchaser 102 selects "Use Friend's Card" option at the payment screen 104b. The purchaser 102 is requested to enter a repayment mechanism at the fulfilment screen 104c at step 708. The purchaser 102 selects his preferred mode of repayment at step 710. The purchaser 102 may choose credit card, debit card, internet banking and so forth as his mode of repayment. Next at step 712, the purchaser 102 is asked to enter the necessary credentials for the selected mode. The credentials may include security PIN, 3D security PIN, name on the card, card expiry date, card number, CVV (Card Verification Value) number and so forth. Next at step 714, an approval is sought from the cardholder (friend) 112 regarding the payment cycle for debiting the purchaser 102. Based on the approval of the cardholder 112 and the payment cycle selected by the cardholder 112 at step 704, the payment mechanism of the purchaser 102 as selected at step 712 is blocked for crediting the cardholder's 112 card account at step 716. Finally at step 718, on the day of the cardholder's 112 selected payment cycle the payment mechanism selected by the purchaser 102 at step 804 is debited and the cardholder's 112 card account is credited with the approved amount of the cardholder 112 by the payment network server 110. Similarly, this process of final settlement is performed for all the cardholders 112 who participated in the purchaser's 102 payment transaction on the merchant App 104.

Figure 8:
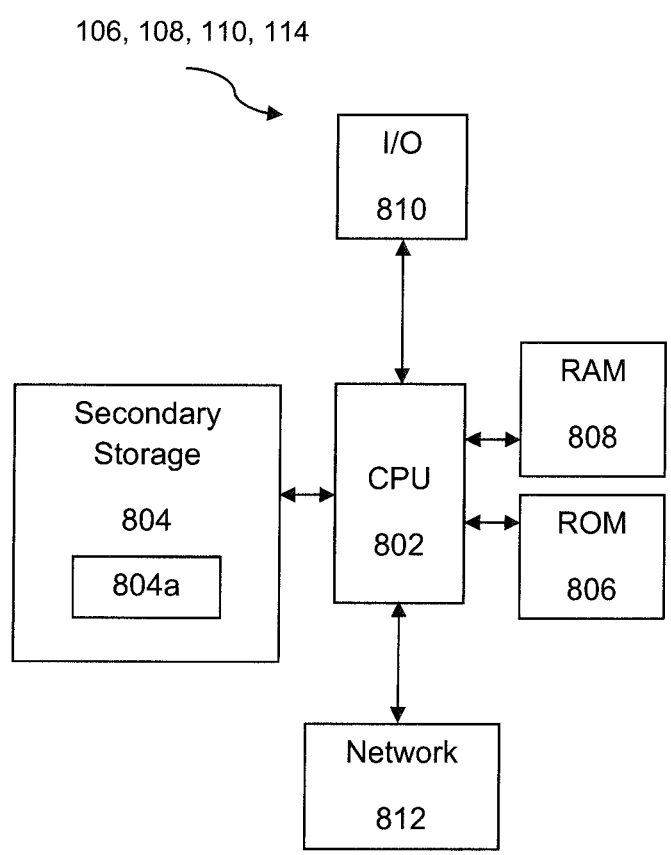
FIG. 8 shows schematically the structure of a server which may be used in the computerised network of FIG. 1 to implement a method in accordance with embodiments of the invention.

FIG. 8 is a block diagram showing a technical architecture of the merchant server 106, the acquirer server 108, the payment network server 110 and/or the issuer server 114.

The technical architecture includes a processor 802 (which may be referred to as a central processor unit or CPU) that is in communication with memory devices including secondary storage 804 (such as disk drives), read only memory (ROM) 806, and random access memory (RAM) 808. The processor 802 may be implemented as one or more CPU chips. The technical architecture may further comprise input/output (I/O) devices 810, and network connectivity devices 812.

The secondary storage 804 is typically comprised of one or more disk drives or tape drives and is used for non-volatile storage of data and as an over-flow data storage device if RAM 808 is not large enough to hold all working data. Secondary storage 804 may be used to store programs which are loaded into RAM 808 when such programs are selected for execution.

In this embodiment, the secondary storage 804 has a processing component 804a comprising non-transitory instructions operative by the processor 802 to perform various operations of the method of the present disclosure. The ROM 806 is used to store instructions and perhaps data which are read during program execution. The secondary storage 804, the RAM 808, and/or the ROM 806 may be referred to in some contexts as computer readable storage media and/or non-transitory computer readable media.

I/O devices 810 may include printers, video monitors, liquid crystal displays (LCDs), plasma displays, touch screen displays, keyboards, keypads, switches, dials, mice, track balls, voice recognizers, card readers, paper tape readers, or other input devices.

The network connectivity devices 812 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other network devices. These network connectivity devices 812 may enable the processor 802 to communicate with the Internet or one or more intranets. With such a network connection, it is contemplated that the processor 802 might receive information from the network, or might output information to the network in the course of performing the above-described method operations. Such information, which is often represented as a sequence of instructions to be executed using processor 802, may be received from and outputted to the network, for example, in the form of a computer data signal embodied in a carrier wave.

The processor 802 executes instructions, codes, computer programs, scripts which it accesses from hard disk, floppy disk, optical disk (these various disk based systems may all be considered secondary storage 804), flash drive, ROM 806, RAM 808, or the network connectivity devices 812. While only one processor 802 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing an application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 802, the RAM 808, and the ROM 806 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 9:
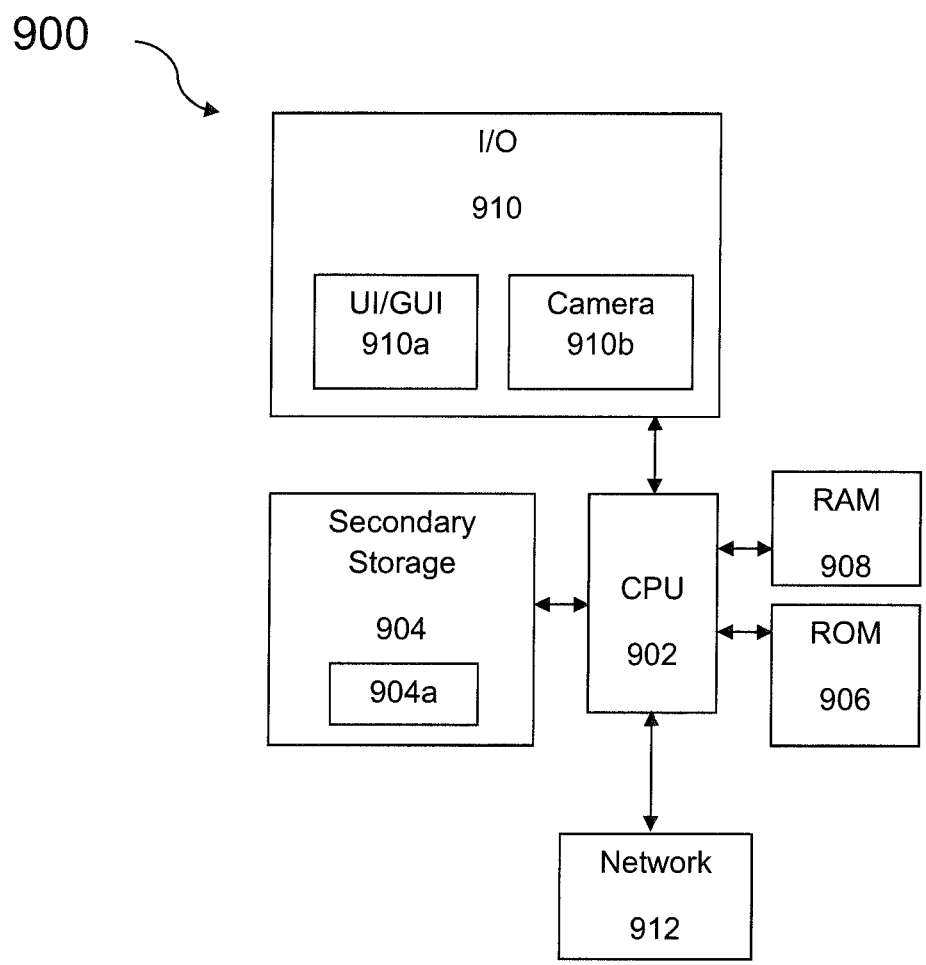
FIG. 9 shows schematically the structure of a communication device which may be used in the computerised network of FIG. 1 to implement a method in accordance with embodiments of the invention.

FIG. 9 is a block diagram showing a technical architecture 900 of a communication device (e.g. the purchaser mobile or electronic device and the cardholder mobile/electronic device). The technical architecture includes a processor 902 (which may be referred to as a central processor unit or CPU) that is in communication with memory devices including secondary storage 904 (such as disk drives or memory cards), read only memory (ROM) 906, and random access memory (RAM) 908. The processor 902 may be implemented as one or more CPU chips. The technical architecture further comprises input/output (I/O) devices 910, and network connectivity devices 912.

The I/O devices 910 comprise a customer interface (UI) 910*a* and a camera 910*b*. The UI 910*a* may comprise a screen in the form of a touch screen, a keyboard, a keypad or other known input device. The camera 910*b* is a device for recording visual images in the form of photographs, film or video signals. The UI 910*a* may be configured to operate with the processor 902 together with the memory devices 904, 906, 908 in conjunction with the network connectivity devices 912 to display to the purchaser/cardholder an authentication request requesting authentication to be input via the I/O devices 910. The authentication may be input via the UI 910*a* or the camera 910*b* (e.g. if the authentication is associated with a biometric).

The secondary storage 904 is typically comprised of a memory card or other storage device and is used for non-volatile storage of data and as an over-flow data storage device if RAM 908 is not large enough to hold all working data. Secondary storage 904 may be used to store programs which are loaded into RAM 908 when such programs are selected for execution.

In this embodiment, the secondary storage 904 has a processing component 904*a*, comprising non-transitory instructions operative by the processor 902 to perform various operations of the method of the present disclosure. The ROM 906 is used to store instructions and perhaps data which are read during program execution. The secondary storage 904, the RAM 908, and/or the ROM 906 may be referred to in some contexts as computer readable storage media and/or non-transitory computer readable media.

The network connectivity devices 912 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other network devices. These network connectivity devices 912 may enable the processor 902 to communicate with the Internet or one or more intranets. With such a network connection, it is contemplated that the processor 902 might receive information from the network, or might output information to the network in the course of performing the above-described method operations. Such information, which is often represented as a sequence of instructions to be executed using processor 902, may be received from and outputted to the network, for example, in the form of a computer data signal embodied in a carrier wave. In embodiments, the network connectivity devices 912 enable the purchaser electronic device and the payment network server to be communicatively connected to each other. The network connectivity devices 912 may also enable the purchaser electronic device to be in communication with the merchant App/server 106 and/or the issuer server 114.

The processor 902 executes instructions, codes, computer programs, scripts which it accesses from hard disk, floppy disk, optical disk (these various disk based systems may all be considered secondary storage 904), flash drive, ROM 906, RAM 908, or the network connectivity devices 912. While only one processor 902 is shown, multiple processors may be present. Thus, while instructions may be discussed as executed by a processor, the instructions may be executed simultaneously, serially, or otherwise executed by one or multiple processors. If an App compatible with embodiments of the invention is used, the processor 902 is configured to execute the App stored in the ROM 906 and/or RAM 908 or the secondary storage 904 for carrying out a payment transaction as described in the exemplary embodiments.

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

The invention claimed is:

1. A payment network server for processing a card-not-present transaction associated with a purchaser, the server comprising at least a computer processor and a data storage device, the data storage device comprising instructions operative by the computer processor to:
   (i) receive, from a merchant server, a payment request for a transaction associated with the purchaser, comprising a payment amount for a product, a plurality of contact mechanisms associated with cardholders eligible for a reward associated with the transaction, and details of the reward;
   (ii) send a selection request using the plurality of contact mechanisms to the cardholders, the selection request comprising the details of the reward, the payment amount and a list of payment cards eligible for the reward;
   (iii) receive, from at least two cardholders of the cardholders eligible for the reward, a selection response collectively comprising at least two card numbers corresponding to at least two payment cards eligible for the reward, and an amount specified by each of the at least two cardholders;
   (iv) request one or more issuer servers to block the amount specified by each of the at least two cardholders using the at least two card numbers;
   (v) dynamically track a cumulative amount by collating the amount specified by each card cardholder of the at least two cardholders;
   (vi) determine that the cumulative amount is equal to or greater than the payment amount;
   (vi) upon determining that the cumulative amount is equal to or greater than the payment amount, generate a virtual card number for one time use based on the at least two card numbers;
   (vii) set, by the payment network server, a spending limit associated with the virtual card number to the payment amount;
   (viii) send a payment response to the merchant server including the virtual card number for the purchaser to use to complete the transaction; and
   (ix) debit the payment amount from a repayment mechanism of the purchaser and credit respective payment amounts to the at least two card numbers received from the at least two cardholders.

2. The payment network server for processing a card-not-present transaction as claimed in claim 1, wherein the data storage device comprises further instructions operative by the computer processor to cause the purchaser to select the repayment mechanism of the purchaser for repayment of the payment amount to the cardholders.

3. The payment network server for processing a card-not-present transaction as claimed in claim 1, wherein debiting the payment amount from the repayment mechanism of the purchaser and crediting respective payment amounts includes crediting the respective payment amounts to the at least two card numbers on specific dates as selected by the at least two cardholders.

4. The payment network server as claimed in claim 1, further configured to receive the payment request based on a selection by the purchaser of the payment cards and the contact mechanisms of the cardholders on a merchant screen, the selection by the purchaser of the payment cards being made by selecting an option available in a drop-down menu on the merchant screen.

5. The payment network server as claimed in claim 4, wherein the merchant screen is one of a merchant application and a merchant website.

6. The payment network server as claimed in claim 1, wherein the reward associated with the transaction depends on the payment cards, issuer banks associated with the payment cards, a nature of a product or service being purchased, the payment amount, and a time of the transaction.

7. The payment network server as claimed in claim 1, wherein the contact mechanisms for the cardholders comprise at least one of contact numbers and usernames for one or more social network platforms.

8. The payment network server as claimed in claim 1, wherein the payment request received from the merchant server comprises an API (Application Programming Interface) call.

9. The payment network server as claimed in claim 1, further configured for verifying credentials of cards of the two cardholders and corresponding authentication inputs against pre-registered information of the two cardholders with the corresponding one or more issuer servers.

10. The payment network server as claimed in claim 1, wherein the data storage device comprises further instructions operative by the computer processor to receive, by the payment network server, a request from the cardholders to register the payment cards for participating in a payment service configured to allow the cardholders to lend the payment amount to the purchaser without disclosing sensitive information of the cardholders, and to register the cardholders in the payment service.

11. The payment network server as claimed in claim 1, wherein the virtual card number corresponds to a non-physical card having a validity period.

12. A computer implemented method for processing a card-not-present transaction associated with a purchaser, the method comprising:
   (i) receiving, from a merchant server, a payment request for a transaction associated with the purchaser, comprising a payment amount for a product, a plurality of contact mechanisms associated with cardholders eligible for a reward associated with the transaction, and details of the reward;
   (ii) sending a selection request using the plurality of contact mechanisms to the cardholders, the selection request comprising the details of the reward, the payment amount and a list of payment cards eligible for the reward;
   (iii) receiving from at least two cardholders of the cardholders eligible for the reward, a selection response collectively comprising at least two card numbers corresponding to at least two payment cards eligible for the reward, and an amount specified by each of the at least two cardholders;
   (iv) requesting one or more issuer servers to block the amount specified by each of the at least two cardholders using the at least two card numbers;
   (v) dynamically tracking a cumulative amount by collating the amount specified by each card cardholder of the at least two cardholders;

(vi) determining that the cumulative amount is equal to or greater than the payment amount;

(vi) upon determining that the cumulative amount is equal to or greater than the payment amount, generating a virtual card number for one time use based on the at least two card numbers;

(vii) set a spending limit associated with the generated virtual card number to the payment amount;

(viii) sending a payment response to the merchant server including the virtual card number for the purchaser to use to complete the transaction; and (ix) debiting the payment amount from a repayment mechanism of the purchaser and crediting respective payment amounts to the at least two card numbers received from the at least two cardholders.

13. The computer implemented method as claimed in claim 12, further comprising causing the purchaser to select the repayment mechanism of the purchaser for repayment of the payment amount to the at least two cardholders.

14. The computer implemented method as claimed in claim 12, wherein debiting the payment amount from the repayment mechanism of the purchaser and crediting respective payment amounts includes crediting the respective payment amounts to the at least two card numbers on specific dates as selected by the at least two cardholders.

15. The computer implemented method as claimed in claim 12, further comprising receiving the payment request based on a selection by the purchaser of the payment cards and the contact mechanisms of the cardholders on a merchant screen, the selection by the purchaser of the payment cards being made by selecting an option available in a drop-down menu on the merchant screen.

16. The computer implemented method as claimed in claim 12, wherein the payment request received from the merchant server comprises an API (Application Programming Interface) call.

17. The computer implemented method as claimed in claim 12, further comprising verifying credentials of cards of the two cardholders and corresponding authentication inputs against pre-registered information of the at least two cardholders with the corresponding one or more issuer servers.

18. The computer implemented method as claimed in claim 12, wherein the virtual card number corresponds to a non-physical card having a validity period.

19. The computer implemented method as claimed in claim 12, the method further comprising: receiving, by a payment network server, a request from the cardholders to register the cardholders for participating in a payment service configured to allow the cardholders to lend the payment amount to the purchaser without disclosing sensitive information of the cardholders, and to register the cardholders in the payment service.

20. The computer implemented method as claimed in claim 12, wherein the contact mechanisms for the cardholders comprise at least one of contact numbers and usernames for one or more social network platforms.

* * * * *